United States Patent [19]

Sumiya et al.

[11] Patent Number: 5,380,808
[45] Date of Patent: Jan. 10, 1995

[54] PROCESS FOR PRODUCING WATER-ABSORBING RESINS

[75] Inventors: Takashi Sumiya; Masashi Date, both of Kyoto; Kenji Tanaka, Otu, all of Japan

[73] Assignee: Sanyo Chemical Industries, Ltd., Kyoto, Japan

[21] Appl. No.: 728,294

[22] Filed: Jul. 11, 1991

[30] Foreign Application Priority Data

Jul. 17, 1990 [JP] Japan ..................... 2-188691
Aug. 29, 1990 [JP] Japan ..................... 2-229103
Sep. 6, 1990 [JP] Japan ..................... 2-237328

[51] Int. Cl.$^6$ .............................................. C08F 220/06
[52] U.S. Cl. .............................. 526/317.1; 526/318.43; 526/318.5
[58] Field of Search ................. 526/88, 318.5, 318.43, 526/317.1

[56] References Cited

U.S. PATENT DOCUMENTS

| | | | |
|---|---|---|---|
| 4,190,562 | 2/1980 | Westerman | 526/318.5 |
| 4,342,858 | 8/1982 | Herman et al. | 526/318.43 |
| 4,654,039 | 3/1987 | Brandt et al. | 526/207 |
| 4,703,067 | 10/1987 | Mikita et al. | 521/63 |
| 4,839,395 | 6/1989 | Masamizu et al. | 521/62 |
| 4,857,610 | 8/1989 | Chmelir | 526/318.5 |

FOREIGN PATENT DOCUMENTS

0303518A2 8/1988 European Pat. Off. .
55-108407 8/1980 Japan .
56-147809 11/1981 Japan .
1178509 1/1988 Japan .................. 526/317.1

*Primary Examiner*—Joseph L. Schofer
*Assistant Examiner*—Tom Weber
*Attorney, Agent, or Firm*—Fish & Richardson

[57] ABSTRACT

The invention concerns a process for producing water-insoluble water-absorbing resins, which comprises the steps of initiating polymerization of an aqueous solution containing 30 to 80% by weight of (a) a hydrophilic vinyl monomer having a functional group and (b) a crosslinking agent by supplying the aqueous solution together with (c) a polymerization initiator to a polymerizing apparatus capable of heating and/or cooling surfaces in contact with the aqueous solution, subsequently causing constant temperature polymerization of the solution without agitating the same by controlling the temperature of the system being polymerized to 20° to 70° C., and elevating, if necessary, the temperature ok the system to be in excess of 70° C. in a stage with a polymerization percentage of 70% or above before completion of polymerization. Obtainable water-insoluble water-absorbing resins have excellent water-absorbing property and have less water-soluble components. Thus, the water-absorbing resins according to the invention are useful for physiological commodities, paper diapers or like sanitary materials, drip absorbing materials, cold water retainers, dew condensation prevention materials for construction materials and so forth.

9 Claims, No Drawings

PROCESS FOR PRODUCING WATER-ABSORBING RESINS

BACKGROUND OF THE INVENTION

1. Field of the Invention

This invention relates to a process for producing water-insoluble water-absorbing resins.

2. Description of the Prior Art

Water-absorbing resins are extensively utilized for physiological commodities, paper diapers or like sanitary materials, drip absorbents, soil water retainers, anti-dew-condensation materials for construction materials and so forth.

A process of producing water-insoluble water-absorbing resins through polymerization of comparatively high density hydrophilic vinyl monomer, an aqueous solution polymerization process and other techniques are well known in the art. Among these techniques there is a process, in which an aqueous solution of hydrophilic vinyl monomer is heat-insulation polymerized in a specific vessel (as disclosed in, for instance, Japanese Patent Application Disclosure No. 108407/1980), a process, in which an aqueous solution of hydrophilic vinyl monomer is polymerized while gels produced under polymerization are pulverized by agitation in a double arm kneeder (as disclosed in, for instance, Japanese Patent Application Disclosure No. 34101/1982), a process, in which a high density aqueous solution of hydrophilic vinyl monomer is polymerized on a belt, the polymerization being carried out simultaneously with drying without applying any external heat (as disclosed in, for instance, Japanese Patent Application Disclosure No. 71907/1983) and a process, in which an aqueous medium mixture containing hydrophilic vinyl monomer and a crosslinking agent is copolymerized by spray or thin film copolymerization in a heat-insulated state (as disclosed in Japanese Patent Application Disclosure No. 147809/1981).

However, when producing water-insoluble water-absorbing resins through polymerization of an aqueous solution containing as high concentration as 30 to 80% by weight of hydrophilic vinylmonomer by either of the polymerization processes noted above, heat of polymerization generated during polymerization causes quick temperature rise to extremely increase the rate of decomposition of the polymerization initiator. In consequence, the weight-average molecular weight (hereinafter referred to as Mw) of the obtained water-absorbing resin polymer is reduced, and also the molecular weight distribution is broadened.

Water-absorbing resins with low Mw and broad molecular weight distribution have problems that water-absorbing performance such as normal pressure water absorption and under-pressure water absorption is reduced. In addition, when a water-absorbing resin greatly containing water-soluble components is used for paper diapers, the stickiness of the diaper surface is increased, or skin reaction or the like will be caused.

Further, when an aqueous solution containing as high concentration as 30 to 80% by weight of hydrophilic vinyl monomer is polymerized by the process disclosed in Japanese Patent Application Disclosure No. 71907/1983 or process disclosed in Japanese Patent Application Disclosure No. 147809/1981, the polymerization initiator is decomposed in a short period of time, resulting in an increase of the residual monomer in the obtained water-absorbing resin polymer. Great residual monomer content have an adverse effect in safety when the resin is used for paper diapers or the like.

SUMMARY OF THE INVENTION

An object of the invention is to provide a process for producing water-absorbing resins having large molecular weight and sharp molecular weight distribution.

With this process it is possible to produce water-absorbing resins, with which both normal pressure water absorption and under-pressure water absorption are high.

In addition, it is possible to produce water-absorbing resins containing less water-soluble component and less residual monomer.

Further, since according to the invention a high concentration aqueous solution is polymerized, the drying of polymer in the form of a hydrous gel requires low energy cost and can be done economically.

Further, the water-absorbing resins obtainable by the process according to the invention are excellent in the secular stability of hydrous gel.

Another object of the invention is to provide a process, in which polymer in the form of a hydrous gel is dried after crushing, thus dispensing with a subsequent pulverizing step and permitting production of water-absorbing resins having very sharp grain distribution.

A still further object of the invention is to provide a process of producing water-absorbing resins, in which the surface of an obtained water-absorbing resin is crosslinked, thus obtaining a water-absorbing resin, which has improved under-pressure water absorption speed and under-pressure water absorption and high gel strength after water absorption and less water-soluble components compared to prior art water-absorbing resins.

The inventors conducted extensive research and investigations to discover a process, which can preclude the problems noted above and permits production of water-insoluble water-absorbing resins having excellent quality, and the invention is predicated in the results of the research and investigations.

Specifically, the invention concerns processes ①, ②, ③ or ④ of producing water-insoluble water-absorbing resins as follows.

Process ①: A process for producing water-insoluble water-absorbing resins, which comprises the steps of initiating polymerization of an aqueous solution containing, at a concentration of 30 to 80% by weight, (a) a hydrophilic vinyl monomer having a functional group and (b) a crosslinking agent by supplying the aqueous solution together with (c) a polymerization initiator to a polymerization apparatus capable of heating and/or cooling of a surface in contact with the aqueous solution, subsequently causing constant temperature polymerization of the aqueous solution without agitating the solution by controlling the temperature of the system to 20° to 70° C. during polymerization, and elevating, if necessary, the temperature of the system to a temperature in excess of 70° C. in a stage with a polymerization percentage of 70% or above before completion of polymerization.

Process ②: A process for producing water-insoluble water-absorbing resins, which comprises the steps of obtaining a particle polymer (I) by drying and pulverizing a water-containing gel of water-insoluble water-absorbing resin obtained by process ①, and crosslinking the surface of the polymer (I) with either (d) a compound having two or more groups capable of reacting with functional groups contained in the polymer (I) or (e) a multi-valent metal compound capable of ion crosslinking.

Process ③: A process for producing water-insoluble water-absorbing resins, in which a water-containing gel of water-insoluble water-absorbing resin obtained by process ① is dried after crushing.

Process ④: A process for producing water-insoluble water-absorbing resins, in which a water-containing gel of water-insoluble water-absorbing resin obtained in process ① is crushed, surfaces of the crushed polymer in the form of hydrous gel are treated with a hydrophobic crosslinking agent (f), and then crosslinking reaction is caused simultaneously with drying.

DESCRIPTION OF THE PREFERRED EMBODIMENT

Process ① will first be described in detail.

The water-insoluble water-absorbing resin polymers obtainable in accordance with the present invention have very high Mw and very sharp molecular weight distribution. Thus, their normal pressure water absorption and under-pressure water absorption are both high while their water-soluble component and residual monomer contents are very low. These features can not be seen in the prior art.

According to the invention as (a) vinyl monomer may be used (1) vinyl monomers having at least one acid group in molecule and/or water-soluble salts of such vinyl monomers, (2) vinyl monomers having at least one tertiary amino group and/or quaternary ammonium salt group in molecule and (3) a vinyl monomer having at least one hydroxyl group in molecule.

Of the compounds (1), examples of vinyl monomer having at least one acid group in molecule are monomers having at least one carboxylic acid group and those having at least one sulfonic acid group.

Examples of monomer having at least one carboxylic acid group are unsaturated monocarboxylic or polycarboxylic acid [e.g., (meth)acrylic acid, ethacrylic acid, crotonic acid, sorbic acid, maleic acid, iraconic acid and cinnamic acid] and anhydrides of such acids (e.g., maleic anhydride). The term "(meth)acrylic" means "acrylic" and "methacrylic".

Examples of monomer having at least one sulfonic acid group are aliphatic or aromatic vinylsulfonic acids [e.g., vinylsulfonic acid, allylsulfonic acid, vinyltoluenesulfonic acid and styrenesulfonic acid], (meth)acrylesulfonic acids [e.g., sulfoethyl (meth)acrylate and sulfopropyl (meth)acrylate] and (meth)acryleamide sulfonic acid [e.g., 2-acrylamide-2-methylpropane sulfonic acid).

Of the compounds (1), examples of water-soluble salt of vinyl monomer having at least one acid group in molecule are alkaline metal salts (e.g., salts of sodium, potassium, lithium, etc.), alkaline earth metal salts (e.g., salts of calcium, magnesium, etc.) and ammonium and amine salts (e.g., salts of alkylamine such as methylamine and trimethylamine and salts of alkanolamine such as triethanolamine and diethanolamine) of vinyl monomer having at least one carboxylic or sulfonic acid.

Each of the compounds (1) may be used either alone or in combination with others.

Examples of the compounds (2), i.e., vinyl monomers having at least one tertiary amino group and/or quaternary ammonium salt group, are (meth)acrylamide, reaction products of dialkylaminoalkyl(meth)acrylate and alkyl halide or dialkyl sulfuric acid [e.g., (meth)acryloiloxyethyl-trimethylammonium halide (halide herein being chloride or bromide, for instance), (meth)acryloiloxyethyltrimethylammonium sulfate, (meth)acryloiloxyethyldimethylathylammonium chloride, (meth)acryloiloxyethyldiethyimethylammonium chloride, (meth)acryloiloxyethyldimethylbenzylammonium chloride, (meth)acryloiloxypropyltrimethylammonium chloride, (meth)acryloiloxypropyltrimethylammonium sulfate], reaction products of dialkylaminohydroxyalkyl(meth)acrylate and alkyl halide or dialkyl sulfuric acid [e.g., (meth)acryloiloxyhydroxyethyltrimethylammonium halide (halide being herein chloride or bromide), (meth)acryloiloxyhydroxyethyltrimethylammonium sulfate, (meth)acryloiloxyhydroxypropyltrimethylammonium chloride, etc.], reaction products of dialkylaminoalkyl(meth)acrylamide and alkyl halide or dialkyl sulfuric acid [e.g., chlorides or bromides of trimethylaminoethyl(meth)acrylamide, chlorides of trimethylaminopropyl(meth)acrylamide, chlorides of diethylmethylaminopropyl(meth)acrylamide, etc.], reaction products of dialkylaminohydroxyalkyl(meth)acrylamide and alkyl halide or dialkyl sulfuric acid [e.g., chlorides of trimethylaminohydroxyethyl(meth)acrylamide, chlorides of trimethylaminohydroxypropyl(meth)acrylamide, chlorides of diethylmethylaminohydroxypropyl(meth)acrylamide, etc.], N-alkylvinylpyridium halides [e.g., N-methyl-2-vinylpyridinium halide (halide being herein chloride or bromide), N-methyl-4-vinylpyridinium chloride, etc.], trialkylallylammonium halides [e.g.. trimethylallylammonium halides (halide being herein chloride or bromide), triethylallylammonium chloride, etc.] and vinyl pyrrolidone. Each of these compounds (2) may be used either alone or in combination with others.

Examples of compounds (3), i.e., vinyl monomers having at least one hydroxyl group in molecule, are hydroxymethyl(meth)acrylate, hydroxyethyl(meth)acrylate and hydroxypropyl(meth)acrylate.

The compounds (1) are preferred among the vinyl monomers shown as (a). More preferred are vinyl monomers having at least one carboxylic acid group in molecule, sodium salts of these monomers, potassium salts of these monomers, and combinations of two or more of the above members.

Where the compounds (1) as vinyl monomer (a) include water-soluble salts as well, the proportion of these water-soluble salts in the monomer of water-insoluble water-absorbing resin is usually 50 to 90 mol %, preferably 60 to 80 mol %. If the proportion is below 50 mol %, obtainable water-absorbing resins have reduced performance. If the proportion exceeds 90 mol %, on the other hand, the pH of obtainable resins is increased to presents problems in the safety of the human skin.

The proportion of water-soluble salt may be controlled (i.e., neutralized) in a desired stage of the process of water-absorbing resin production. For example, it is possible to carry out partial neutralization in the stage of vinyl monomer (a) or in the stage of water-containing gel polymer as polymerization product.

According to the invention, as crosslinking agent (b) may be used (4) compounds having at least two vinyl groups, (5) compounds having at least one vinyl groups and having at least one group capable of reacting with a functional group of vinyl monomer (a) and (6) compounds having at least two groups capable of reacting with functional groups of monomer (a).

Examples of the compounds (4) are as follows.

① Bis(meth)acrylamide :
N,N-alkylenebis(meth)acrylamides with alkylene group having carbon numbers of 1 to 6 (e.g., N,N-methylenebisacrylamide).

② Diester or polyester of polyols and unsaturated monocarboxylic or polycarboxylic acid :
Di(meth)acrylic or tri(meth)acrylic acid esters of polyols [e.g., ethylene glycol, tirmethylol propane, glycerol, polyoxyethylene glycol, polyoxypropyrene glycol, etc.], unsaturated polyesters [e.g., obtainable by reaction of above mentioned polyols and unsaturated acides such as maleic acid and di(meth)acrylic or tri(meth)acrylic acid esters [obtainable by reaction of polyepoxide and (meth)acrylic acid], for instance.

③ Carbamylester :
Carbamylesters obtainable by reacting polyisocyanate [e.g.,tolylene diiocyanate, hexamethylene diisocyanate, 4,4'-diphenylmethane diisocyanate and NCO-group-containing prepolymer (obtainable by reacting polyisocyanate such as mentioned above and a compound containing active hydrogen atom)] and hydroxyethyl(meth)acrylate.

④ Divinyl or polyvinyl compounds :
Divinyl benzene, divinyl toluene, divinyl xylene, divinyl ether. divinyl ketone, trivinyl benzene, etc.

⑤ Di(meth)allyl or poly(meth)allyl ethers of polyols :
Di(meth)allyl or poly(meth)allyl ether, e.g., polyethyleneglycoldiallyl ether, allylated starch and allylated cellulose of polyols [e.g., alkylene glycol with carbon numbers of 2 to 20, glycerol, polyalkylxylene glycol, polyalkylene polyol, hydrocarbons, etc.]

⑥ Diallyl or polyallyl ester of polycarboxylic acid
Diallyl phthalate, diallyl adipate, etc.

⑦ Ester of unsaturated monocarboxylic or polycarboxylic acid and mono(meth)allylether of polyol :
(Meth)acrylic acid ester of polyethyleneglycol-monoallylether etc.

⑧ Polyallyloxyalkanes :
Tetraallyloxyethane etc.

As compounds (5) may be used ethylenic unsaturated compounds having at least one group capable of reacting with a functional group of vinyl monomer (a) such as hydroxyl group, epoxy group and cationic group. Examples of the unsaturated compounds containing hydroxyl group are N-methylol(meth)acrylamide, etc.

Examples of the unsaturated compounds containing epoxy group are glycidyl(meth)acrylate, etc. Examples of the unsaturated compounds containing cationic group are N,N,N-trimethyl-N-(meth)acryloiloxyethyl-trimethyl-ammonium chloride, N,N,N-triethyl-N-(meth)acryloiloxyethyl-ammonium chloride, dimethylaminoethyl(meth)acrylate, diethylaminoethyl(meth)-acrylate, etc.

As compounds (6) may 0e used compounds having two or more groups capable of reacting with functional groups of vinyl monomer (a), e.g., hydroxyl, epoxy and cationic groups. Examples of compounds having two or more epoxy groups in molecule are ethyleneglycoldi-glycidyl ether, propyreneglycoldiglycidyl ether, glycerol-1,3-diglycidylether, polyethyleneglycoldiglycidylether, 1,6-hexanedioldiglycidylether, bisphenol-A-epichlorohydrin type epoxy resins, etc. Examples of compounds having two or more isocyanate groups in molecule are 2,4-trilene diisocianate, hexamethylene diisocianate, 4,4'-diphenylmethane diisocyanate, etc. Examples of compounds having two or more hydroxyl groups in molecule are glycerol, ethylene glycol, propylene glycol, polyethylene glycol, polypropyrene glycol, etc. Examples of compounds having two or more amino groups in molecule are ethylene diamine, diethylene triamine, triethylene tetramine, tetraethylene pentamine, etc.

These compounds (6) may be used for reaction with vinyl monomer (a) before polymerization or used for crosslinking reaction after polymerization.

Among the crosslinking agents (b) noted above, compounds (4) and (5) which can be copolymerized with vinyl monomer (a) are preferred. More preferred are compounds (4). Particularly preferred are N,N-methylenebis(meth)acrylamide, (poly)ethyleneglycol-di(meth)acrylate, tetraallyloxyethane, trimethylpropane tri(meth)acrylate and like copolymerizable crosslinking agents having comparatively high water solubility.

According to the invention, the amount of crosslinking agent (b) is variable depending on the degree of self-crosslinking of vinyl monomer (a), but usually it is 0.0001 to 5%, preferably 0.001 to 2%. more preferably 0.01 to 1.0%, with respect to the weight of vinyl monomer (a). If the amount of agent (b) exceeds 5%, obtainable water-absorbing resins will show excessive gel strength when absorbing water, and their water absorption performance is thus reduced. If the amount is below 0.0001%, obtainable water-absorbing resins show low gel strength when absorbing water and thus become sols. In addition, their water-soluble component content is increased.

According to the invention, the concentration of vinyl monomer (a) in aqueous solution is suitably 30 to 80%, preferably 35 to 75%, more preferably 40 to 60%, by weight for Mw is increased with increasing polymerization concentration when the polymerization temperature is controlled in the temperature range according to the invention, i.e., 20° to 70° C.

If the polymerization concentration is below 20%, obtained polymers have low Mw, and consequently obtained water-absorbing resins have low water absorption performance. If the polymerization concentration exceeds 80%, on the other hand, a phase is reduced to solid like, and it is difficult to continue uniform polymerization.

According to the invention, the aqueous solution noted above can be obtained by dissolving or dispersing vinyl monomer (a) and crosslinking agent (b) in water or a blend solvent containing water-soluble organic solvent (e.g., methanol, ethanol, acetone, dimethylsulfoxide, dimethylformamide, etc.) and water, preferably water.

According to the invention, it is possible to add, if necessary, polysaccharide such as starch and/or cellulose to the system to be polymerized.

Examples of starch are such natural starches as potato starch, corn starch and rice starch and such processed starches as alpha-starch and oxidized starch.

Examples of cellulose to be used are hydroxyalkyl cellulose, organic acid ester cellulose, alkyl ether cellulose, carboxylalkyl cellulose, etc.

The amount of polysaccharide is usually 0 to 20%, preferably 0 to 10%, with respect to the weight of vinyl monomer (a).

According to the invention, as polymerization initiator (c) may be used azo compounds (e.g., azobisisobuthyronitrile, azobiscyano valerate, 2,2'-azobis(2-diaminopropane)hydrochloride, etc.), inorganic peroxides (e.g., ammonium persulfate, potassium persulfate, sodium persulfate, etc.), organic peroxides (e.g., hydrogen peroxide, benzoil peroxide, di-t-buthyl peroxide, cumene hydroperoxide, succinic peroxide, etc.) and redox catalysts (e.g., combinations of such reducing agents as alkaline metal sulfites or bisulfites, ammonium sulfite or bisulfite and ascobic acid and such oxidizing agents as alkaline metal persulfates, ammonium persulfate and peroxides). Each of these polymerization initiators may be used either alone or in combination with others.

Among these compounds, azo compounds, inorganic peroxides and organic peroxides (i.e.. thermal decomposition type radical polymerization initiators) are preferable.

The amount of polymerization initiator (c) is usually 0.0005 to 5%, preferably 0.001 to 1%, more preferably 0.005 to 0.5%, by weight of vinyl monomer (a). If the amount exceeds 5%, obtained polymers undesirably have reduced Mw. If the amount is below 0.0005%, on the other hand, either polymerization will not be initiated, or a very long time is inefficiently required until initiation.

According to the invention, the polymerization initiation temperature is varied depending on the decomposition temperature of the polymerization initiator used, but it is usually 0° to 70° C. preferably 20° to 65° C., more preferably 30° to 60° C. If the polymerization initiation temperature is below 0° C., with a usual radical polymerization initiator, polymerization will not be initiated since the decomposition speed of the initiator is too low, or the speed of polymerization if initiated is inefficiently very low. If the polymerization initiation temperature exceeds 70° C., the decomposition speed of the polymerization initiator is increased to make it difficult to control the temperature of the system being polymerized. In addition, the chain termination constant of monomer during polymerization is increased to result in reduction of Mw or increase of the molecular weight distribution.

According to the invention, the polymerization temperature during polymerization is usually 20° to 70° C., preferably 30° to 65° C., more preferably 40° to 60° C. If the polymerization temperature is below 20° C., the polymerization speed is extremely low. This means that long polymerization time is inefficiently required to obtain a certain polymerization percentage and reduce residual monomer. If the polymerization temperature exceeds 70° C., on the other hand, the decomposition speed of the polymerization initiator is extremely increased. In addition, the chain termination constant of monomer during polymerization is increased to result in reduced Mw and/or increased molecular weight distribution. Further, since the polymerization initiator is decomposed in short time, obtained water-absorbing resin polymers greatly contain residual monomer.

According to the invention the term "constant temperature polymerization" does not mean that polymerization is carried out at a constant temperature but means a status of polymerization that the temperature of the system being polymerized is controlled in a specific temperature range.

According to the invention, the temperature difference between the polymerization initiation temperature and highest attained temperature during polymerization is desirably as small as possible. The temperature difference is usually 60° C. or below, preferably 40° C. or below, more preferably 30° C. or below. If the temperature difference exceeds 60° C., the molecular weight distribution is increased even if the polymerization temperature is in the range of 20° to 70° C., thus leading to increase of the molecular weight distribution, and hence increase of the water-soluble component content and reduction of the water absorption performance.

According to the invention, the polymerization may be carried out in an inert gas stream atmosphere, if necessary. For the inert gas stream may be used nitrogen gas, helium gas, carbon dioxide gas, etc.

For polymerization according to the invention, any polymerizing apparatus, which is capable of heating and/or cooling of surfaces in contract with the aqueous solution noted above, may be used so long as it permits constant temperature polymerization through control of the the temperature of the system being polymerized and the temperature difference between the polymerization initiation temperature and highest attained temperature during polymerization in a predetermined range. Examples of such polymerizing apparatus are apparatuses capable of polymerizing vinyl monomer (a) in a sheet-like form, e.g., a belt conveyor type polymerizing apparatus, in which the aqueous solution on a belt of a belt conveyor or in which the aqueous solution sandwiched between upper and lower belts of a belt conveyor can be heated and/or cooled from the lower side or both upper and lower sides of the belt conveyor, a heat exchange type polymerizing apparatus, in which the aqueous solution can be heated and/or cooled from either or both side plate surfaces, a centrifugal thin film type polymerizing apparatus, in which the aqueous solution can be heated and/or cooled from a peripheral wall, and a filter press type polymerizing apparatus, in which the aqueous solution can be heated and/or cooled from either or both sides, and a cylindrical polymerizing apparatus provided with a jacket for heating and/or cooling the aqueous solution from surfaces in contact with the solution. Preferred polymerizing apparatuses are belt conveyor type and filter press type polymerizing apparatuses, which are capable of heating and/or cooling the contact surfaces noted above and permitting constant temperature polymerization of the aqueous solution without agitation thereof. More preferred apparatuses are those, in which the aqueous solution can be heated and/or cooled from both sides.

Where the aqueous solution is polymerized in a sheet-like form, the aqueous solution is suitably supplied to the polymerizing apparatus such that it has a thickness of 1 to 100 mm, preferably 3 to 50 mm, more preferably 5 to 30 mm. If the thickness of the aqueous solution exceeds 100 mm, control of the polymerization temperature of portions of the solution spaced apart from the contact surfaces (e.g., a portion of the solution on the side opposite the side, from which heating and/or cooling are effected in case of heating and/or cooling the solution from one side and central portion in the thickness direction in case of heating and/or cooling from both sides) is difficult even where the aqueous solution is heated and/or cooling from the surfaces in contact with the solution. This leads to undesired consequences that obtainable water-absorbing resins will have reduced Mw and/or increased molecular weight distribution.

Where the temperature of the system being polymerized is controlled by heating and/or cooling the aqueous solution from surfaces in contact with the solution, a heating/cooling medium is usually supplied for heating and/or cooling to the side opposite the surfaces in contact with the aqueous solution. It is possible to use any heating/cooling medium, e.g., coolant, cold water, hot water, cold air, hot air, water steam, etc.

The material providing the surfaces in contact with the aqueous solution is not particularly limited, but it is suitably heat conductive in view of facilitating the heat transfer between the aqueous solution and heating-/cooling medium.

Examples of such material are such metals as stainless steel, iron, copper, nickel alloys, aluminum, bronze, lead and silver, glass and synthetic resins such as polyethylene, polypropyrene, polytetrafluoroethylene, etc. containing metal powders or inorganic powders.

Where metals are used as the material providing the surfaces in contact with the aqueous solution, the surfaces noted above may be coated with well-known anti-stickiness resin, e.g., fluorine resins, silicone resins, polyethylene, polypropyrene and like synthetic resins to such an extent that the heat conductivity of the material is not greatly spoiled for the purpose of facilitating the separation of polymer from the contact surfaces after polymerization.

According to the invention, the polymerization can be completed by elevating temperature, if necessary, to be in excess of 70° C. in a stage with a polymerization percentage of 70% or above. Completing the polymerization by elevating temperature to be in excess of 70° C. in a state with a polymerization percentage of 70% or above is preferred to completing polymerization at a temperature of 20° to 70° C. in that doing so permits reduction of the polymerization time and also permits water-absorbing resins with less residual monomer content to be obtained.

In a stage with a polymerization percentage no higher than 70%, frequently some of the polymerization initiator still remains. Therefore, if the temperature is elevated to be in excess of 70° C. in this stage, the remaining polymerization initiator is liable to be decomposed quickly to result in reduced Mw. For this reason, a desired timing of temperature elevation is in a stage with a polymerization percentage of 80%. The polymerization percentage can be determined by measuring the quantity of unpolymerized residual monomer by liquid chromatography or the like after forcibly stopping the polymerization by cooling or like operation.

The temperature, at which the polymerization is completed, is suitably in excess of 70° C., preferably 75° to 80° C. According to the invention the completion of polymerization does not always mean 100% polymerization percentage, but the produced water-absorbing resin may contain monomer in a usually permissible range (e.g., no higher than 1%).

Water-insoluble water-absorbing resin particles can be obtained from a water-containing gel polymer obtained after polymerization by the method according to the invention by drying the polymer and then pulverizing the dry polymer to a predetermined grain size with a usual pulverizer.

Now, process ② will be described.

According to the invention, by crosslinking the surfaces of polymer (I) as water-insoluble water-absorbing resin particles with compound (d) having at least two groups capable of reacting with functional groups of polymer (I) or (e) multi-valent metal compound capable of ion crosslinking, it is possible to produce resins, which provide higher gel strength, have less water-soluble components and are excellent in the stability of hydrous gel and further have increased under-pressure water absorption speed, without reducing water absorption performance.

Where polymer (I) contains acid group as functional group, it is possible to use compounds having at least two epoxy, isocyanate, carboxyl, amino, etc. groups in molecule as compound (d) and to use multi-valent metal compounds (e).

Where polymer (I) contains cationic group as functional group, it is possible to use compounds having at least two epoxy, isocyanate, carboxyl, etc. group in molecule as compound (d).

Where polymer (I) contains hydroxyl group as functional group, it is possible to use compounds having at least two epoxy, isocyanate, carboxyl, etc. group in molecule as compound (d).

Examples of the compounds (d) having at least two epoxy groups in molecule are ethyleneglycoldiglycidyl ether, propyreneglycoldiglycidyl ether, glycerol-1,3-diglycidyl ether, polyethyleneglycoldiglycidyl ether, 1,6-hexanedioldiglycidyl ether, and bisphenol-A-epichlorohydrin type epoxy resins. Examples of the compounds (d) having at least two isocyanate groups in molecule are 2,4-trilene diisocyante, hexamethylene diisocyanate, and 4,4'-diphenylmethane diisocyanate. Examples of the compounds (d) having at least two hydroxyl groups in molecule are glycerol, ethylene glycol, propyleneglycol, polyethyleneglycol, and polypropyreneglycol. Examples of the compounds (d) having at least two amino groups in molecule are ethyelediamine, diethylenetriamine, triethylenetetramine, and tetraethylenepenthamine. Examples of the compounds (d) having at least two carboxyl groups are oxalic acid, malonic acid, succinic acid, glutaric acid, adipic acid, and poly(meth)acrylic acid.

Examples of the multi-valent metal compounds (e) capable of ion crosslinking are hydroxides of alkali earth metals (e.g., calciuum, magnesium, etc.), zinc. aluminum, titanium, etc., halides of these metals and salts of these metals (e.g., sulfates, carbonates, acetates, etc. of such metals).

Among compounds (d) and multi-valent metal compounds (e), former compounds (d) are preferred. Particularly preferred are compounds having at least two epoxy groups in molecule.

The amount of compounds (d) and multi-valent metal compounds (e) can be varied depending on the degree of crosslinking of polymer (I), water absorption performance required for resin, gel strength and so forth, but usually it is 0.001 to 5%, preferably 0.001 to 3%, more preferably 0.01 to 1%, by weight of polymer (I).

Compounds (d) or multi-valent compounds (e) may be added in the form of original liquid or powder to polymer (I). However, they are usually added in the form of aqueous solution or aqueous dispersoid for obtaining uniform crosslinking reaction.

The concentration of such aqueous solution or dispersoid is varied depending on the composition, molecular weight, etc., of compound (d) or the multi-valent compound (e), but usually it is 0.1 to 7%, preferably 1 to 50%, by weight.

The amount of compound to be added in the form of the aqueous solution or dispersoid noted above can be varied depending on the water absorption performance required for resin, concentration of the compound and so forth, but usually it is 0.1 to 30%, preferably 0.5 to 15%, more preferably 1 to 10%, by weight of the water-absorbing resin particles. If the amount is below 1.0%, uniform crosslinking can not be obtained. If the amount exceeds 30%, on the other hand, the crosslinking agent liquid permeates into the water-absorbing resin particles to reduce the water absorption performance although obtainable water-absorbing resins may have provide increased gel strength and contain reduced water-soluble components.

The compounds (d) or multi-valent metal compounds (e) may be added to polymer (I) by any method so long as uniform blending can be obtained. For example, the aqueous solution or dispersoid of compound (d) or (e) may be added by spraying, showering, dripping, etc. to polymer (I) while agitating the system in a Nauta blender, a kneeder blender, a paddle blender, a V-type blender. a ribbon blender, a screw blender, an air blender. etc. Alternatively, the aqueous solution or dispersoid of compound (d) or (e) may be added and be mixed continuously to polymer (I) in a mixer or blender as noted above, which is capable of high speed agitation.

According to the invention the mixture of polymer (I) and compound (d) or (e) may be heated, if necessary, for crosslinking reaction.

The temperature, to which the mixture is elevated in case of heating the same, varies depending on the reactivity of compound (d) or (e) and functional group contained in polymer (I), but usually it is 20° to 250° C., preferably 30° to 200° C.

If the temperature exceeds 250° C., polymer (I) undergoes decomposition to result in undesired reduction of the water absorption performance or coloring.

The heating apparatus is not particularly limited, and a hot air drier, a fluid layer drier, a Nauta drier, a rotary kiln, etc. may be used as desired.

Now, process ③ will be described.

By crushing the hydrous gel of water-insoluble water-absorbing resin obtained by process ① such that particles of gel with grain sizes of 50 to 2,000 μm, preferably 100 to 1,500 μm, more preferably 200 to 1,000 μm, constitute 80% or above of the pulverized gel, drying can be extremely facilitated, and it is possible to dispense with pulverizing step after drying. Thus, it is possible to reduce energy cost required for drying and pulverization and obtain water-absorbing resin particles with extremely sharp grain size distribution and extremely low minute particle content.

The apparatus for crushing the gel is not particularly limited so long as it can crush hydrous gel polymer in a block-like or sheet-like form to the grain sizes noted above. Examples of such crushing apparatus are a vertical slitter having a cutter blade, a horizontal slitter having a cutter blade, a cutter type crusher having a rotary blade and a meat chopper having a perforated plate with a predetermined opening diameter and a rotary blade. Examples of commercially available cutters of the above type are a pelletizer, a "Gainax crusher", a V-type pulverizer, and a BO type pulverizer (all these being manufactured by Horai Tekkosho), a "Rotoplex" (manufactured by Hosokawa Micron) and a meat chopper (manufactured by Makino Tekkosho). Further, for crushing hydrous gel polymer to the grain size noted above, two or more different hydrous gel pulverizers as noted above may be combined for use as multistage pulverizer. As examples of combinations of commercially available gel pulverizers, the "Gainax crusher" and V type pulverizer, the "Gainax crusher" and BO type pulverizer, the "Gainax crusher" and meat chopper, and the "Rotoplex" and meat chopper, may be used in combination.

According to the invention, a releasing agent may be used for the purposes of preventing attachment of gel particles to one another at the time of crushing and drying and also preventing attachment of gel to the crushers and drieres. Examples of such releasing agent are inorganic powders (e.g., calcium carbonate, aluminum hydroxide, aluminum oxide, silicon dioxide, silicon dioxide surface-treated to be hydrophobic, titanium oxide, etc.), natural material particles (e.g., wheat flours, rice particles, starch, carboxymethylcellulose, hydroxyethylcellulose, hydroxypropylcellulose, etc.), synthetic polymer or synthetic resin powders (e.g., polyvinyl alcohol, polyester, silicone resins, fluorine resins, polyethylene, polypropyrene, acrylic resins, etc.), artionic surfactants (e.g., triethanolamine lauryl sulfate, polyoxyethylene sodium lauryl sulfate, sodium lauryl sulfosuccinate, N-laurylsarcosine sodium salt, sodium α-olefin sulfonate, sodium lauryl phosphate, N-coconut oil fatty acid acyl-L-monosodium glutaminate, sodium lauryl sulfoacetate, etc.), non-ionic surfactants (e.g., 1:1 coconut oil fatty acid diethanolamide, lauryl dimethylamine oxide, glycerol monostearate, polyethyleneglycol monostearate, sorbitan monolaurate, polyoxyethylenesorbitan monolaurate, nonylphenylpolyoxyethylene, octylphenolpolyoxyethylene, dodecylphenol polyoxyethylene, etc.), cationic surfactants (e.g., stearyltrimethyl ammonium chloride, distearyldimethylammonium chloride, lanorin fatty acid aminopropylethyldimethylammonium ethyl sulfate, etc.), amphoteric surfactants (e.g., betaine coconut oil fatty acid amide propyldimethyl aminoacetate, betathe lauryl dimethylaminoacetate, betathe 2-alkyl-N-carboxylmethyl-N-hydroxyethylimidazolinium, etc.), and polymer surfactants (e.g., cationated cellulose, polyethylene glycol, polypropylene glyclol, sodium polyacrylate, etc.) as well as well-known silicone and fluorine surfactants. Among these releasing agents, the inorganic powder and anionic and non-ionic surfactants are preferred.

According to the invention, a releasing agent may be provided, if necessary, at any time. Usually, it is provided to the aqueous solution, and/or before, during and/or after pulverization of the polymer gel, preferably before, during and/or after pulverization of the gel.

A powdery releasing agent may be added in the powdery state or in a stage of aqueous dispersoid or solution. A liquid releasing agent may be added in situ or in a state of aqueous dispersoid or solution.

The amount of the releasing agent may be varied depending on the composition of polymerizable monomer, concentration of polymerization, size of gel particles after pulverization, kind of pulverizer and so forth. With a powdery releasing agent, the amount thereof usually is 0 to 50%, preferably 0.001 to 30%, with respect to the weight of polymerizable monomer. If the amount of a powdery releasing agent exceeds 50%, the product will contain a great amount of releasing agent, and therefore may generate dust or have reduced water absorption performance. When using a powdery releasing agent, excess releasing agent may be separated and recovered in any stage after pulverization of gel. The amount of a liquid releasing agent usually is 0 to 5%, preferably 0.0001 to 3%, by weight. If the amount exceeds 5%, the powder fluidity of the product is deteriorated.

Now, process ④ will be described.

According to the invention, by treating the surfaces of the pulverized hydrous gel polymer with hydrophobic crosslinking agent (f) before drying the polymer by heating, the sole surfaces of water-absorbing resin is further crosslinked. Thus, it is possible to produce water-absorbing resins, which can show higher gel strength, contain less water-soluble components and are excellent in the stability of water-absorbing gel. Further, it is possible to increase under-pressure water absorption speed.

If a hydropholic crosslinking agent is used to the hydrous gel, it is liable to permeate into the hydrous gel. Therefore, the water absorption performance is reduced although obtainable water-absorbing resins may have increased gel strength and reduced water-soluble component content.

As hydrophobic cross/inking agent (f) may be used compounds having two or more groups capable of reacting with functional groups of the polymer such as hydrophobic multi-functional glycidyl compounds. Specific examples of the agent are resorcindiglycidyl ether, 1,6-hexanediol-diglycidyl ether, neopenthylglycoldiglycidyl ether, polytetramethyleneglycoldiglycidyl ether, and diglycidyl ortho-phthalate. Among these examples, resorcin diglycidyl ether and 1,6-hexanedioldiglycidyl ether are preferred.

The amount of hydrophobic crosslinking agent (f) can be varied depending on the amount of crosslinking agent added to the aqueous solution containing the polymerizable monomer, water absorption performance required for water-absorbing resin, gel strength and so forth. Usually, it is 0.001 to 5%, preferably 0.005 to 1%, more preferably 0.01 to 0.5%, of the total weight of the polymerizable monomer.

By thermally drying the hydrous gel polymer containing added hydrophobic agent (f), the drying of the hydrous gel and crosslinking of the surfaces of water-absorbing resin with the hydrophobic crosslinking agent can be realized simultaneously.

The temperature of thermal heating is not particularly limited, but usually it is 100° to 250° C., preferably 110° to 200° C.

The apparatus for thermal treatment also is not particularly limited, and it is possible to use a usual thermal drier such as a hot air drier, a flowing layer drier, a "Nauta" drier and a rotary kiln.

Examples

The invention will De hereinafter further described in conjunction with its examples and comparative examples. These examples described herein are illustrative and not restrictive.

Normal pressure water absorption, under-pressure water absorption, water-soluble component content and gel strength and residual monomer content were measured in the following ways, it being to be understood that % is by weight.

* Normal pressure water absorption 1 g of water-absorbing resin was charged into a tea bag made from 250-mesh nylon mesh, which was then held dipped in physiological salt solution (i.e., aqueous solution containing 0.9% of sodium chloride) for 60 minutes and then taken out and left for water removal for 15 minutes. Then, the weight increase was measured as normal pressure water absorption.

* Under-pressure water absorption 0.1 g of water-absorbing resin was charged into and uniformly spread in a cylindrical plastic tube having an inner diameter of 30 mm and a height of 80 mm and with a 250-mesh nylon mesh applied to the bottom. It was then given a load of 20 $g/cm^2$ by putting a weight having an outer diameter of 30 mm on it.

Then, the plastic tube was held dipped with the nylon mesh down in a vessel 12 cm in diameter filled with 80 ml of physiological salt solution. The weight increase of the water-absorbing resin due to absorption of the physiological salt solution was measured 5 and 30 minutes afterwards as the under-pressure water absorption at the respective time instants.

* Water-soluble component content

The amount of water-soluble component obtained after extraction for 3 hours by the method described in U.S. Pat. No. 4,654,039 of from column 21, line 5 to column 23, lines 50 as "Extractable Polymer Content Determination" was measured as water-soluble component content.

* Gel strength 1 g of water-absorbing resin and 40 g of physiological salt solution were mixed to obtain a 40-time diluted gel, and then the gel strength was measured using a neo curdmeter (manufactured by Iio Denki Co., Ltd.).

* Residual monomer content 1 g of water-absorbing resin and 250 g of physiological salt solution were charged into a 300-ml beaker for extraction by agitation for 3 hours. Then, swelled gel was filtered out, and the residual monomer content in the filtrate was measured by liquid chromatography.

Example 1

600 g of an aqueous solution containing 50% acrylic acid, 0.05 g of tetrallyloxyethane and 0.05 g of "Peroyl-SA" (a polymerization initiator manufactured by Nihon Yushi Kogyo) were sufficiently blended to prepare as aqueous solution. The dissolved oxygen content of the solution was then reduced to 1 ppm by introducing nitrogen gas into the solution. The resultant solution was then poured into a stainless steel butt having dimensions of 400 mm by 300 mm by 100 mm filled with nitrogen gas, and top of the butt was then sealed with polyethylene film to prevent oxygen from entering the butt. The thickness of the aqueous solution at this time was 5 mm. This stainless steel butt was then held immersed in a hot water bath at 45° C. to a height of 30 mm. About 15 minutes afterwards, polymerization was initiated. The temperature of the system being polymerized was controlled in the hot water bath to be 55° to 60° C., and the polymerization was completed after about 5 hours. To this hydrous gel polymer was added 240 g of an aqueous solution containing 50% of sodium hydroxide, followed by kneading with a kneader so that neutralizing of 72 mol % of acrylic acid, and then the system was dried. The dried system was then pulverized to a grain size of 20 meshes or below to obtain a water-insoluble water-absorbing resin [A].

Example 2

360 g of acrylic acid, 0.05 g of methylenebisacrylamide and 200 g of deionized water were poured into and blended in a separable flask provided with a thermometer and a cooling tube. Then, 312 g of an aqueous solution containing 48% of sodium hydroxide was gradually added to the mixture while holding the temperature of the system within 40° C., thus neutralizing 75 mol % of acrylic acid. To this solution was added 0.05 g of "V-50", (a azo type polymerization initiator manufactured by Wako Junyaku Kogyo). Then, the dissolved oxygen content in the resultant solution was reduced to 1 ppm or below by introducing nitrogen gas into the solution. This solution was poured into a glass test tube 1 cm in diameter, and polymerization was initiated in a hot water bath at 50° C.

The temperature of the system being polymerized was held to be 40° to 50° C. and was elevated to 80° C. about 45 minutes after reaching of a polymerization percentage of 85%. Then about 20 minutes afterwards the polymerization was completed.

This hydrous gel was dried with a hot air drier and then pulverized to a grain size of 20 meshes or below to obtain a water-insoluble water-absorbing resin [B].

Example 3

7.2 kg of acrylic acid, 1 g of trimethylolpropane triacrylate and 4 kg of tap water were poured into and blended in a neutralizing trough with jacket. Then 6 kg of an aqueous solution containing 48% of sodium hydroxide was gradually dripped into the blend solution while holding the temperature thereof at 40° C., thus neutralizing 75 mol % of acrylic acid. Then, 0.5 g of potassium persulfate was added to the solution, and the dissolved oxygen content of the resultant solution was set to 0.5 ppm by introducing nitrogen gas. This solution was supplied to a movable belt polymerizer (or steel belt polymerizer), which is capable of heating and/or cooling of belt surfaces under nitrogen stream atmosphere, such that its thickness was 8 mm, and its polymerization was initiated by heating it to 50° C. When the temperature of the polymer was increased to 55° C., the beit surfaces were heated and cooled to continue polymerization while maintaining the temperature of the system being polymerized at 50° to 60° C. About 45 minutes after reaching of a polymerization percentage of 87%, the hydrous gel was transferred to a maturing trough at 75° C. and held in the trough for about 30 minutes before completing the polymerization.

The hydrous gel polymer was dried with a hot air drier and then pulverized to a grain size of 20 meshes or below to obtain a water-insoluble water-absorbing resin [C].

Example 4

5 g of an aqueous solution containing 10% of ethyleneglycoldiglycidyl ether (manufactured by Nagase Kasei Kogyo) was dripped onto 100 g of particles of water-insoluble water-absorbing resin [A] obtained in Example 1 while the resin particles were agitated in a household juice mixer rotated at a revolution number of 10,000, followed by further agitation for one minute. Then, the mixture was taken out and dried at 150° C. for 30 minutes using an air circulation drier, and the surfaces of the particle polymer were crosslinked, thus obtaining a water-insoluble water-absorbing resin [D].

Example 5

100 g of particles of water-insoluble water-absorbing resin [B] obtained in Example 2 was charged into the kneeder, and the surfaces of resin [B] were crosslinked by spraying 2.5 g of an aqueous solution containing 40% of aluminum sulfate while agitating the system, thus obtaining a water-insoluble water-absorbing resin [E] without subsequent thermal drying.

Example 6

While continuously supplying 10 kg of particles of water-insoluble water-absorbing resin [C] obtained in Example 3 to a paddle mixer (with a rotation number of 3,000) provided with a nozzle, to which an aqueous solution or the like can be supplied continuously, 200 g of an aqueous solution containing 30% of ethylenediamine from the nozzle to crosslink the surfaces of resin [C], thus obtaining a water-insoluble water-absorbing resin [E].

Example 7

1 kg of the hydrous gel obtained in Example 3 was pulverized with a gel pulverizer to a grain size of 200 to 1,500 μm while spraying as releasing agent 30 g of an aqueous solution containing 10% of "Profan-EX-24" (which was coconut oil fatty acid diethanolamide manufactured by Sanyo Chemical Industries, Ltd.).

100 g of the pulverized gel was heated in a hot air drier at 150° C. for 45 minutes to obtain a water-insoluble water-absorbing resin [G]. In this case, it was possible to dispense with pulverization after drying.

Example 8

0.07 g of "EX-212" (a hydrophobic diepoxy crosslinking agent manufactured by Nagase Kasei Kogyo) was coated on the surfaces of 100 g of pulverized gel obtained in Example 7, and then the gel was heated in a hot air drier at 170° C. for 30 minutes to effect surface crosslinking and drying of the hydrous gel simultaneously to obtain a water-insoluble water-absorbing resin [H].

Example 9

5 kg of hydrous gel obtained in Example 3 was crushed with a meat chopper. Of the hydrous gel particles obtained by crushing, those with grain sizes of 300 to 1,000 μm constituted about 93%.

Then, 0.1 g of "EX-721" (a hydrophobic diepoxy crosslinking agent manufactured by Nagase Kasei Kogyo) was coated on the surfaces of 100 g of the crushed hydrous gel, and then the gel was heated in a hot air drier at 150° C. for 45 minutes to effect surface crosslinking and drying of the hydrous gel simultaneously, thus obtaining a water-insoluble water-absorbing resin [I].

Comparative example 1

600 g of an aqueous solution containing 50% of acrylic acid, 0.05 g of tetrallyloxyethane and 0.05 g of "Perloil-SA" (manufactured by Nihon Yushi Kogyo) were sufficiently blended to obtain a solution of vinyl monomer (a). The dissolved oxygen content of this solution was reduced to 1 ppm by introducing nitrogen gas into the solution. Subsequently, the solution was poured into a stainless steel butt having dimensions of 400 mm by 300 mm by 100 mm filled with nitrogen gas, and the top of the butt was sealed with polyethylene film. The thickness of the solution of vinyl monomer (a) at this time was 5 mm.

The solution of vinyl monomer (a) was then heated to 45° C. and subjected to heat-insulated polymerization. The polymerization proceeded with violent heat generation and was ended in about 15 minutes. The highest attained temperature during the polymerization was about 150° C.

To this hydrous gel polymer was added 240 g of an aqueous solution containing 50% of sodium hydroxide, and the mixture was kneaded with a kneader to neutralize 72 mol % of acrylic acid. The system was then dried and then pulverized to a grain size of 20 meshes or below, thus obtaining a contrast water-absorbing resin [J]

Comparative example 2

Vinyl monomer mixtures (a) comprising 397 g of acrylic acid with 75 mol % thereof neutralized with sodium hydroxide, 0.05 g of methylenebisacrylamide, 0.05 g of "V-50" and 600 g of water were supplied to a double warm kneeder (250 mm by 200 mm by 60 mm) with jacket, and nitrogen gas was introduced until the dissolved oxygen content of the solution was 1 ppm or below. Polymerization of the solution was initiated by supplying hot water at 50° C. to the jacket while agitating the system. About 15 minutes afterwards, the temperature of polymer was increased 90° C., but the agitation was continued until completing the polymerization. The highest attained temperature during the polymerization was 115° C., and hydrous gel polymer pulverized to a size of 5 to 20 mm was obtained by agitation. This hydrous gel was dried with hot air and then pulverized to a grain size of 20 meshes or below to obtain a contrast water-absorbing resin [K].

Comparative example 3

100 g of particles of water-absorbing resin [J] obtained in Comparative example 1 was charged into a household juice mixer, and 5 g of an aqueous solution containing 10% of ethyleneglycoldiglycidyl ether was dripped onto the resin while agitating the system at a rotation number of 10,000, followed by further agitation for one minute. Subsequently, the mixture was taken out and heated in an air circulation drier at 150° C. for 30 minutes to effect surface crosslinking of water-absorbing resin particles [J], thus obtaining water-absorbing resin [L].

Comparative example 4

100 g of particles of water-absorbing resin [K] obtained in Comparative example 2 was charged into a kneeder, and its surfaces were crosslinked by spraying 2.5 g of an aqueous solution containing 40% of aluminum sulfate, thus obtaining a water-absorbing resin [M].

Table 1 shows the results of measurements of the normal pressure water absorption, under-pressure water absorption, water-soluble component content and gel strength of the water-absorbing resins obtained in Examples 1 to 9 and Comparative examples 1 to 4. Table 2 shows the results of measurements of the grain distribution and residual monomer content of the same resins.

TABLE 1

| | Water-absorbing resin | Normal pressure absorption (g/g) | Under-pressure absorption (g/g) | | Water-soluble component (%) | Gel strength ($10^4$ dynes/cm$^2$) |
|---|---|---|---|---|---|---|
| | | | After 5 min. | After 10 min. | | |
| Example | | | | | | |
| 1 | A | 67 | 20 | 34 | 3.4 | 2.7 |
| 2 | B | 64 | 21 | 31 | 3.5 | 2.5 |
| 3 | C | 66 | 20 | 32 | 3.2 | 2.6 |
| 4 | D | 65 | 38 | 42 | 2.5 | 3.5 |
| 5 | E | 61 | 35 | 40 | 2.8 | 3.4 |
| 6 | F | 64 | 37 | 41 | 2.9 | 3.2 |
| 7 | G | 65 | 21 | 32 | 3.2 | 2.6 |
| 8 | H | 61 | 35 | 41 | 2.8 | 3.4 |
| 9 | I | 63 | 36 | 40 | 2.7 | 3.2 |
| Comparative example | | | | | | |
| 1 | J | 51 | 2 | 8 | 21.5 | 0.9 |
| 2 | K | 58 | 6 | 17 | 14.8 | 1.4 |
| 3 | L | 49 | 12 | 18 | 20.5 | 1.8 |
| 4 | M | 55 | 15 | 26 | 14.2 | 2.0 |

TABLE 2

| | Water-absorbing resin | Grain size distribution (%) | | | Residual monomer (ppm) |
|---|---|---|---|---|---|
| | | 20 to 30 meshes | 30 to 140 meshes | under 140 meshes | |
| Example | | | | | |
| 1 | A | 28.4 | 61.8 | 9.8 | 500 |
| 2 | B | 27.5 | 62.3 | 10.2 | 350 |
| 3 | C | 25.7 | 65.4 | 8.9 | 300 |
| 4 | D | 29.5 | 65.8 | 4.8 | 500 |
| 5 | E | 28.5 | 68.3 | 3.2 | 350 |
| 6 | F | 25.2 | 70.9 | 3.9 | 300 |
| 7 | G | 8.5 | 90.7 | 0.8 | 300 |
| 8 | H | 11.6 | 88.0 | 0.4 | 250 |
| 9 | I | 14.5 | 85.3 | 0.2 | 250 |
| Comparative example | | | | | |
| 1 | J | 28.5 | 57.2 | 14.1 | 1100 |
| 2 | K | 30.3 | 58.7 | 10.7 | 900 |
| 3 | L | 29.5 | 59.2 | 10.1 | 1100 |
| 4 | M | 32.3 | 59.7 | 7.7 | 900 |

The invention has the following effects.

(1) It is possible to produce water-absorbing resins, which have high molecular weight and sharp molecular weight distribution.

(2) It is possible to produce water-absorbing resins, which have high normal pressure and under-pressure water absorption.

(3) It is possible to produce water-absorbing resins, which have less water-soluble component and residual monomer contents.

(4) Since high concentration aqueous solution is polymerized, energy cost required for drying hydrous gel polymer is low, which is economical.

(5) The obtainable hydrous gel has excellent secular stability.

(6) In the case of process ③ or ④ noted before, the hydrous gel polymer is crushed before drying, and it is possible to dispense with a pulverizing step. In addition, it is possible to produce water-absorbing resins, which have very sharp grain size distribution.

(7) By carrying out surface crosslinking in process ③ or ④ noted before, it is possible to produce water-absorbing resins, which have improved under-pressure water absorption speed (i.e., under-pressure water absorption for 5 minutes), degree of under-pressure water absorption, high gel strength after water absorption and less water-soluble component content compared to prior art water-absorbing resins.

Prior art water-absorbing resins produced through heat-insulated polymerization of as high concentration alakaline metal salt of acrylic acid and acrylic acid as 30% or above comparable to the concentration according to the invention in the presence of a crosslinking agent, difficultly have high molecular weight of polymer and shape molecular weight distribution. Thus, they are inferior in the water absorption performance and greatly contain water-soluble components. According to the invention, on the other hand, the temperature of the system being polymerized is controlled to be in a predetermined range through external heating and/or cooling to attain constant temperature polymerization. Thus obtainable polymers have high molecular weight and sharp molecular weight distribution. Thus, obtainable water-insoluble water-absorbing resins have excellent water absorption performance and less contain water-soluble components. This effect can be enhanced when the surfaces of the water-insoluble water-absorbing resin are crosslinked by process ② or ③ noted above.

With the above effects, the water-insoluble water-absorbing resins obtainable according to the invention are useful for various industrial purposes requiring water absorption, water retention, swelling, gel formation, etc., for instance water-absorptive pad, sanitary or like materials used in contact with man's body (e.g., infant or adult paper diapers, physiological napkins and incontinence pads), materials used in contact with foods, for instance freshness retaining materials, cold retaining materials and drip absorbers, materials for separating water from oil of other dehydrating or drying agents, plant and soil water retainers, sludge or like agglomeration agents, anti-condensation agents, and water-blocking materials for electric cord, optical fibers and civil engineering and construction work purposes.

We claim:

1. A process for producing water-insoluble water-absorbing resins comprising the steps of:
    initiating polymerization of an aqueous solution containing 30 to 80% by weight of (a) a hydrophilic vinyl monomer having a functional group and (b) a crosslinking agent by supplying said aqueous solution together with (c) a polymerization initiator to a polymerizing apparatus capable of heating and-/or cooling surfaces in contact with said aqueous solution; and
    subsequently polymerizing said aqueous solution in the form of a sheet or a thin film with a thickness of 3 to 50 mm without agitating said solution but by controlling the temperature of the system being polymerized by heating and/or cooling surfaces to 30° to 65° C. during polymerization, wherein the temperature difference between the polymerization initiation temperature and the highest attained temperature during polymerization is no higher than about 30° C.

2. A process for producing water-insoluble water-absorbing resins according to claim 1, further comprising elevating wherein said temperature of the system being polymerized to be in excess of 70° C. in a stage with a polymerization percentage of 70% or above before completion of polymerization.

3. A process for producing water-insoluble water-absorbing resins according to claim 1, wherein said crosslinking agent (b) is capable of copolymerization with said vinyl monomer (a) and amounts to 0.0001 to 5% by weight of said vinyl monomer (a).

4. A process for producing water-insoluble water-absorbing resins according to one of claims 1 to 3, wherein said aqueous solution contains 40 to 60% by weight of said vinyl monomer (a).

5. A process for producing water-insoluble water-absorbing resins comprising the steps of:
    obtaining a particle polymer (I) by drying and pulverizing a hydrous gel of water-insoluble mater-absorbing resin obtained by the process according to one of claims 1 to 3; and
    crosslinking the surfaces of said polymer (I) with either (d) a compound having two or more groups capable of reacting with functional groups contained in said polymer (I) or (e) a multi-valent metal compound capable of ion crosslinking.

6. A process for producing mater-insoluble mater-absorbing resins comprising the steps of crushing a hydrous gel of water-insoluble water-absorbing resins obtained by the process according to one of claims 1 to 3 and drying said crushed hydrous gel.

7. A process for producing water-insoluble water-absorbing resins comprising the steps of crushing a hydrous gel of water-insoluble water-absorbing resin obtained by the process according to one of claims 1 to 3, treating the surfaces of said crushed gel of polymer with (f) a hydrophobic crosslinking agent and subsequently causing crosslinking reaction simultaneously with drying.

8. A process for producing water-insoluble water-absorbing resins according to claim 6, wherein said hydrous gel of polymer is crushed such that gel particles with grain sizes of 100 to 1,500 $\mu$m constitute 80% or above of the crushed gel.

9. A process for producing water-insoluble water-absorbing resins according to claim 7, wherein said hydrophobic crosslinking agent (f) is at least one compound selected from the group consisting of resorcinoldiglycidyl ether, 1,6-hexanedioldiglycidyl ether, neopenthylglycoldiglycidyl ether, polytetramethyleneglycoldiglycidyl ether and diglycidyl orthophthalate ether.

* * * * *